June 10, 1952  N. P. DARASH  2,600,213
CROSS SLIDE STOP MECHANISM
Filed Jan. 30, 1946  2 SHEETS—SHEET 1

INVENTOR.
NICHOLAS P. DARASH
BY
Kwis, Hudson, Boughton & Williams
ATTORNEYS

*INVENTOR.*
NICHOLAS P. DARASH
BY
Kwis, Hudson, Boughton & Williams
ATTORNEYS

Patented June 10, 1952

2,600,213

UNITED STATES PATENT OFFICE 2,600,213

CROSS SLIDE STOP MECHANISM

Nicholas P. Darash, Cleveland, Ohio, assignor to The Warner and Swasey Company, Cleveland, Ohio, a corporation of Ohio Application January 30, 1946, Serial No. 644,350

14 Claims. (Cl. 29—65)

This invention relates to a stop means for stopping the feeding movement of a tool carrying member of machine tools and has for its chief object to provide a presettable stop means for selectively stopping a movable member of a machine tool at one or more preselected positions thereof.

More specifically, the invention has as its object to provide a selectively presettable stop means for the slide of a lathe, or other machine tool, whereby the slide may be successively stopped at a plurality of positions corresponding to various machining operations performed by the tools carried by the slide. Thus, an operator may perform a plurality of machining operations at a rapid rate without the necessity of repeatedly determining the exact moment when the feeding movement of the slide should stop and the feed controlling lever should be disengaged.

Another object of the invention is to provide a plurality of circumferentially adjustable and rotatable cams, driven in timed relationship with the movement of a slide of a machine tool, and a lever selectively positionable in the path of any one of said cams to stop the feeding movement of the slide at one or more preselected positions.

Another object of the invention is to provide improved means for circumferentially adjusting the position of the rotary cams of a cross slide stop mechanism.

A further object of the invention is to provide limit stops for the cross slide or other movable member of a machine tool in combination with manually settable means to selectively stop said member at one or more, preselected, positions intermediate said limit stops.

The invention may be briefly summarized as consisting in certain novel details of construction and combinations and arrangements of parts which will be described in the specification and set forth in the appended claims.

In the accompanying sheets of drawings which illustrate the preferred embodiment of my invention:

Before beginning the detail description of the invention it is well to notice that this device is intended to provide means for automatically stopping a movable member of a machine tool at one or more preselected positions thereof, and while the invention is illustrated as being associated with the cross slide of a machine tool it is to be understood that it is not so limited but may also be used upon the carriage or a turret saddle.

Figure 1:
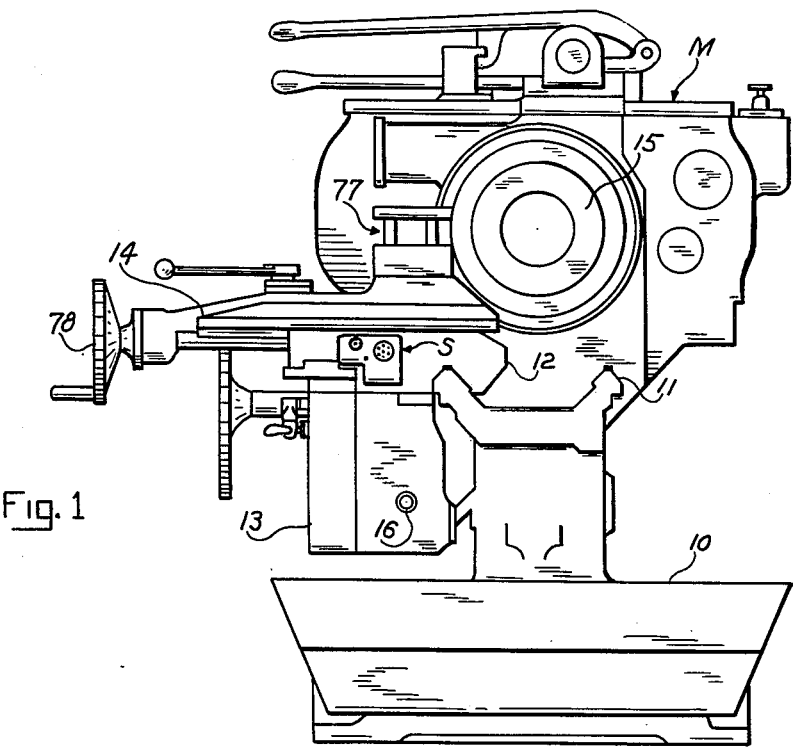
Fig. 1 is an end elevation of a portion of a machine tool equipped with the improved stop means.

Referring now to the drawings, in Fig. 1 I have disclosed an end elevational view of a machine tool, designated M, with the turret saddle and turret removed for clarity of illustration. The machine tool is of conventional design and comprises a bed 10 having ways 11 for supporting a carriage 12 for movement longitudinally of the machine, an apron 13 fastened to the carriage to move therewith, and a cross slide 14 supported upon suitable ways at the top of the carriage for movement transversely of the machine. Positioned upon the apron 13 is the improved stop mechanism, designated generally as S. The carriage and apron as well as the cross slide are driven in timed relation with the spindle 15 by means of a feed shaft 16 and the usual gearing connections, as is well known in the art.

Figures 2, 3:
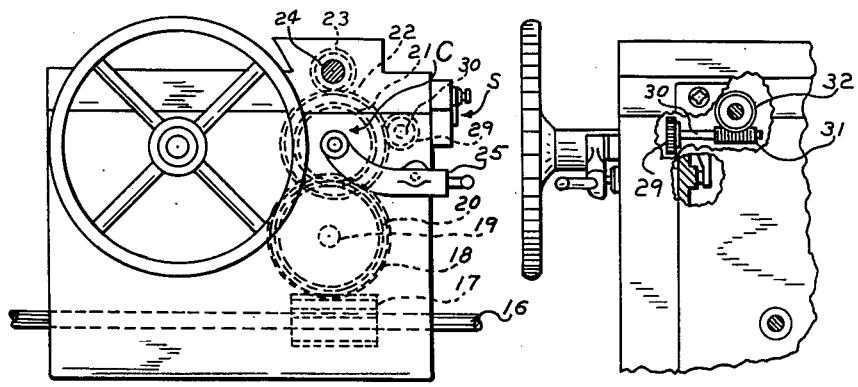
Fig. 2 is a front elevation of the apron and carriage of the machine tool showing the power drive for the cross slide and the clutch operating lever therefor.
Fig. 3 is a fragmentary side elevation of the apron and carriage with parts broken away to show the driving connections for the stop mechanism, the view being taken from the right of Fig. 2.

Disposed upon the feed shaft 16 is a worm 17 in driving engagement with a worm wheel 18 mounted upon the shaft 19 which also carries a spur gear 20 (see Fig. 2). Gear 20 is in driving engagement with a spur gear 21 which carries one element of a clutch mechanism, designated generally by C. The other element of the clutch mechanism is mounted upon a spur gear 22 which is in turn in engagement with a pinion 23 fixed to a lead screw 24 and said screw is threadingly engaged with the nut (not shown) which is carried by the cross slide for actuating the latter.

The clutch C is of the type described in United States Patent No. 1,685,310, issued to Edward P. Burrell et al. on September 25, 1928, to which patent reference is had for the details of the clutch mechanism. For the purposes of describing this invention it is only necessary to notice that the clutch is brought into operative engagement by means of a feed controlling lever 25 which is manually rocked in an upward direction to effect the engagement of the clutch, the lever 25 being retained in its clutch engaging position by means of a pin 26 (see Fig. 6) which is received in an opening provided in a bushing 27 screwed into an opening 28 of the apron 13. The clutch is released, by means subsequently to be described, when the pin 26 is forced from the recess whereupon the feed controlling lever rocks downwardly to disengage the clutch and stop the feeding movement of screw 24 and the movement of cross slide 14.

Referring now to Figs. 2 and 3, there is shown a pinion 29 on shaft 30 which is driven by the gear 22 (forming a part of the driven clutch member) thus producing rotation of shaft 30 in timed relationship with the rotation of screw 24 and the movement of the cross slide. The shaft 30 carries a worm 31 which is in driving engagement with a worm wheel 32 splined to a rotatable drum 33 (Fig. 5) which is rotatably supported in a two-part housing to be referred to later. The ratio of gears 22 and 29 and of the worm 31 and worm wheel 32 is such that the drum 33 travels through one complete revolution while the cross slide is moving from its extreme outward position to its extreme inner position. The periphery of drum 33 is provided with a plurality of camming means formed as rings 34, each provided on its outer circumference with a single projection or cam 35. These rings with their cams constitute the adjustable stop actuating means of my improved stop mechanism, and while the preferred embodiment has been illustrated as comprising six such rings the invention is not so limited since a greater or lesser number of rings may be provided, the important feature being that there is one such cam ring for each operative step of the machining operation to be performed in the completion of a cycle of operations.

Figures 5, 6:
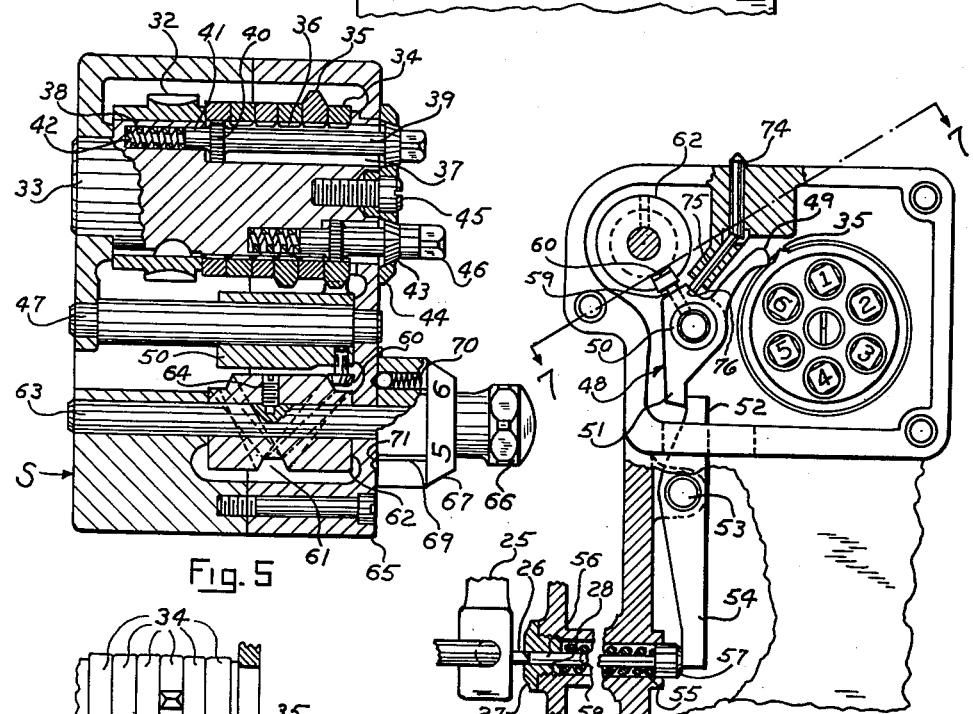
Fig. 5 is a sectional view taken on the line 5—5 of Fig. 4 showing the construction of my improved stop mechanism, certain parts being omitted for clarity of illustration.
Fig. 6 is a side elevation of the improved stop mechanism with the cover removed and parts broken away to show the connections for releasing the clutch operating lever.

To provide for circumferential adjustment of the cam rings, the internal circumference of each cam ring 34 is provided with internal gear teeth 36, and the drum 33 has slotted openings in the circumference thereof, there being one such opening for each ring 34 with said openings being circumferentially spaced at substantially equal distances about the drum. The slotted openings are formed by longitudinally extending bores 37 adjacent the outer circumference of the drum, the bores being so located that their circumferences intersect the outer circumference of the drum thus forming the longitudinally extending openings in the drum's outer surface. The said bores are of different lengths so that the resulting openings in the drum's circumference each terminate in alignment with the teeth 36 on one of the rings 34, and the bores each having extensions 38 of reduced diameter entirely enclosed within the circumference of the drum 33. Disposed in each of the bores 37 is a rod or shaft 39 having a pinion 40 with spur gear teeth formed thereon, said teeth extending through the openings in the drum to mesh with the teeth 36 of the corresponding cam ring member 34. The said rods or shafts have reduced extensions 41 journaled in the reduced openings 38 and disposed between the ends of said extensions 41 and the bottom of openings 38 are springs 42 which tend to force the shafts or rods 39 outwardly, or to the right as seen in Fig. 5.

Figure 4:
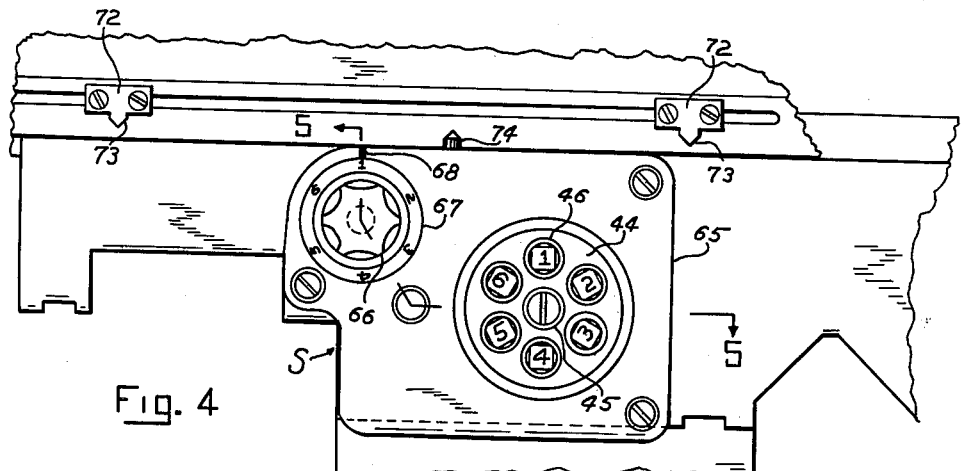
Fig. 4 is an enlarged fragmentary side elevation of the carriage, the top of the apron and the lower portion of the cross slide showing the adjusting means for the stop mechanism.

The rods 39 are each provided adjacent their outer ends with cone shaped collars or integral bosses 43 cooperating with similar cone shaped openings in a cover plate 44 which is retained in position by means of a screw 45 threaded into the drum 33 so as to be rotatable with the latter. The rods 39 project beyond the collars or bosses 43 varying distances to serve as an identification means, the rod corresponding to the innermost ring 34 having the least length externally of the coned collar 43, while the rod associated with the outermost ring has the greatest external extension. As a further identification means the ends of the rods may carry suitable indicia as is indicated in Fig. 4. The outer extremities of the rods or shafts 39 have polygonal surfaces 46 for the reception of a wrench or other tool. The said ends of the rods could, of course, be provided with other means for the reception of a suitable adjusting tool.

To adjust the positions of the cam projections 35 about the circumstance of the drum to correspond with the position at which it is desired to stop the feeding movement of the cross slide, the operator places a suitable tool upon the end 46 of each rod 39 in turn and presses slightly inwardly against the action of the spring 42 to disengage the cone surface 43 from the similar cone surface in the cover plate. Thereupon, the rod may be freely turned to rotate, by means of pinion 40 and gear teeth 36, the cooperating ring 34 until the cam 35 has reached its desired position. When the end pressure is removed from the rod 39 the spring 42 will force said rod slightly outward until the cone surfaces on the rod and cover plate are in firm engagement to frictionally hold the ring in its adjusted position.

Mounted within the housing of the stop mechanism S is a shaft 47 extending in parallel relationship to the axis of drum 33. Upon the shaft 47 there is mounted a cam actuated member or lever 48 which can rock about the shaft 47 and also slide longitudinally along the shaft. An upper arm 49 of the lever 48 has a width substantially the same as the width of a single cam ring 34 and normally rides upon the outer surface of a cam ring so that the said lever will be rocked when the cam portion 35 contacts the arm 49. The lever 48 has an extended sleeve portion 50 surrounding the shaft 47 and extending a distance substantially equal to that occupied by the cam rings 34. Extending downwardly from sleeve 50 is an integral arm 51 of substantially the same longitudinal dimension as that of the sleeve 50. The lower end of arm 51 is in engagement with the upper end of lever 52 (Fig. 6), pivoted at 53, and having a downwardly extending arm 54 which rocks towards the outer cover of the apron 13 when actuated by the cam-operated lever 48.

An opening 55 is provided through the wall of the apron adjacent the lower end of the arm 54 and in alignment with the bushing 27 previously mentioned. Disposed within the opening of bushing 27 is a pin 56 which extends through the opening 55 and has a head 57 on the outer end thereof sliding within and projecting outwardly of the opening 55. Disposed within the opening 55 is a compression spring 58 in engagement with the bushing 27 and the pin head 57 and exerting its force upon the head to keep it in positive engagement with the lower end of arm 54. This arrangement effects rocking of the lever 52 so as to maintain it in constant engagement with arm 51 of the cam-actuated lever 48 to rock the latter to maintain the arm 49 thereof in constant engagement with the peripheral surface of a cam ring 34. Hence, when a cam comes into contact with arm 49 it will be rocked thereby in the opposite direction thus causing arm 51 to rock lever 52 and move pin 56 against the action of spring 58. As pin 56 moves outwardly through the opening in bushing 27, it displaces pin 26 whereupon clutch lever 25 will rock downwardly to disengage the clutch and stop the movement of the cross slide.

To provide for longitudinal adjustment of the cam-operated lever 48 for successive cooperation with each of the cam rings 34, the sleeve 50 is provided with an obliquely projecting stud 59 which has a roller 60 mounted on its outer end. The roller 60 is engaged in an endless cam groove 61 located in an indexible drum 62 which is mounted upon a shaft 63 and fixed thereto by means of a screw 64 for rotation therewith. The shaft 63, journaled in the two-part housing 65 for the stop mechanism S, extends parallel with the axes of shaft 47 and drum 33, and also extends beyond the forward part of the housing 65 of the stop mechanism. The two parts of the housing 65 are secured together by means of suitable screws. On the outwardly extending end of shaft 63 is attached a manually operable knob 66 provided with an extension 67 forming a dial bearing suitable indicia corresponding to that upon the outer ends of the rods 39. A suitable indicium mark or pointer 68 is carried by the housing 65 of the stop mechanism and cooperates with grooves or similar marks 69 on the dial portion 67 extending in alignment with the indicia thereon. Disposed within a recess in the dial portion 67 is a spring-actuated detent 70 which cooperates with recesses 71 provided upon the face of the housing 65 and circumferentially spaced about the shaft 63. The recesses are equal in number to the number of cam rings and each recess corresponds to a dial indicium.

Figure 7:
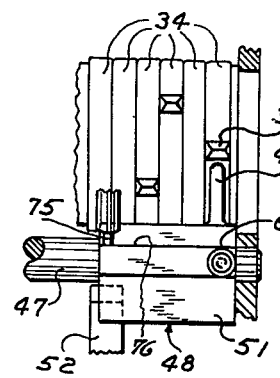
Fig. 7 is a fragmentary view of the rotatable cams and shiftable lever of the improved stop mechanism with the lever positioned at one extreme of its movement to cooperate with the first cam, the view being taken on line 7—7 of Fig. 6 with certain parts removed for clarity of illustration.
Figure 8:
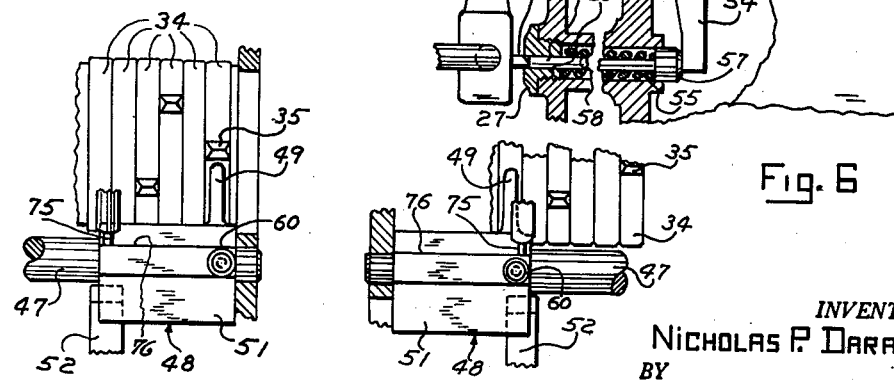
Fig. 8 is a view similar to Fig. 7 showing the shiftable lever moved to its other extreme position.

In order to select a particular cam ring for actuation of the stop mechanism the operator grasps knob 67 and rotates it until the indicium thereon corresponding to that borne by the selected cam ring as evidenced by the corresponding indicium on the end of rod 39 is in line with pointer 68. This effects rotation of drum 62 causing cam-groove 61 to move stud 59, and hence lever 48, longitudinally along shaft 47 and thus position arm 49 upon the indicated cam ring 34. Figure 7 shows one position of lever 48 with its arm 49 riding upon the first of the cam rings 34, while Fig. 8 illustrates the lever 48 as having been moved to its other extreme position with the arm 49 now in engagement with the last cam ring. It will be seen from these figures that the lower arm 51 of the cam-actuated lever 48 is of such extent as to remain in engagement with the upper end of lever 52 throughout the entire range of longitudinal movement of the lever 48 thereby maintaining the lever 48 in operative engagement with the clutch disengaging means at all times.

Additional stop means are provided for the purposes of defining the extreme positions of the cross slide. This additional stop means comprises a pair of dogs 72 which are adjustably secured to the cross slide and have downwardly extending cam-shaped portions 73 for engagement with the top of a pin 74 extending upwardly from the stop mechanism S. The said pin 74 is received in a vertical bore of an enlarged portion of the stop mechanism housing and adjacent the lower end of pin 74 is an enlarged opening communicating with an obliquely directed opening also provided in the enlarged portion of the housing. A pin 75 slides within the obliquely directed opening and has a cam face at its upper end cooperating with a similar cam face upon the lower end of pin 74 disposed with the above mentioned enlarged opening. The lower end of pin 75 contacts an upstanding longitudinal extending shoulder 76 provided on sleeve 50 of lever 48. The construction is such that when the cross slide 14 has reached one of its extreme positions, one of the cam faces 73 on a dog 72 will contact the upper end of pin 74 depressing it and thus forcing pin 75 against shoulder 76 so as to rock lever 48. The rocking of lever 48 will, as above described, rock lever 52 forcing pin 56 outwardly through the opening in bushing 27 and thus displace pin 26 carried by the clutch lever 25. The clutch controlling feed lever 25 will thereupon rock downwardly to disengage the clutch and stop the movement of cross slide 14.

Mounted upon the cross slide 14 is a tool supporting turret 77, shown here as of the square type, for supporting a plurality of tools for successive machining operations upon a workpiece mounted on the machine tool. As is understood in the art, any one of the tools may be employed to perform more than one operative step in a machining cycle and hence, while the present disclosure shows an indexible support for receiving four tools, it is desirable to provide automatic stop means of greater number than the number of tools in order that there may be more than one operation performed by each tool. It is obvious that indexible tool supports other than the square type could also be employed and a correspondingly different number of camming rings 34 would then be used.

In setting up the machine tool for a machining cycle in accordance with this invention, the operator will first mount the desired tools upon the indexible tool holder 77. Having indexed the tool holder to place one of such tools in operative position, he will then move the cross slide by means of the manually actuated hand wheel 78 to the position at which the feeding movement of the cross slide and tool holder should stop. It will be understood that during this setting up operation the spindle will not be in operation and the feed shaft 16 will not be rotating. The feed controlling lever 25 is then lifted and pin 26 carried thereby is inserted in the opening of bushing 27. The operator then grasps knob 66 and sets the dial 67 so that the numeral 1 is in alignment with pointer 68. This will position arm 49 of lever 48 upon the first cam ring 34. He will then place a wrench or other suitable tool upon the polygonal head 46 of rod 39 bearing numeral 1, press inwardly slightly, and rotate the rod 39 until cam projection 35 has moved into engagement with arm 49. This point will be determined by the fact that cam 35 will rock levers 48 and 52 to force pin 56 outwardly through the opening in bushing 27 thus displacing pin 26 and allowing the feed controlling lever 25 to drop downwardly. When the machining operation is being effected by a forward movement of the cross slide the adjustment of cam ring 34 should be effected by rotating the rod 39 in one direction whereas if the machining operation is to be performed by the reverse movement of the cross slide the cam ring 34 should be adjusted by rotating the rod 39 in the reverse direction.

Having set up the stop mechanism for one tool, the operator then proceeds through the same steps for each successive machining operation preferably rotating the knob 66 to the next succeeding numeral for each succeeding stop and correspondingly adjusting the associated rod 39 bearing the like numeral. In each such setting operation the clutch controlling lever 25 will be again positioned with its pin 26 in the opening of bushing 27, the dropping of said lever indicating in each instance when the corresponding cam 35 has been properly adjusted to engage arm 49.

With the apparatus thus set up, the cross slide is moved to its starting position, knob 66 is turned until the numeral 1 on dial 67 is in alignment with pointer 68, the spindle 15 and feed shafts 16 are placed in operation, and the feed controlling lever 25 is moved upwardly and its pin 26 again disposed in the recess of bushing 27. Feeding of the cross slide will thereupon begin and continue until the tool has completed the first machining operation whereupon the first cam ring 34 strikes arm 49 to "knock out" pin 26 to allow the feed controlling lever 25 to drop thus disengaging the clutch C and stopping feeding of the cross slide. The operator then turns knob 66 to bring the next numeral on dial portion 67 into alignment with pointer 68 thus moving arm 49 to cooperate with the next cam ring 34. He then indexes tool holder 77 to bring the next tool into cutting position, and reengages clutch C by moving the feed controlling lever 25 to bring pin 26 into the opening of bushing 27. Feeding movement is again imparted to the cross slide 14 and continues until the second machining operation is completed and the corresponding cam 35 strikes arm 49 to again "knock out" pin 26 of feed controlling lever 25 to disengage the clutch and stop the movement of the cross slide. These steps of indexing the tool carrier, turning dial 67 to the corresponding position, reengaging the clutch by moving the feed controlling lever, and the subsequent "knock out" thereof are repeated until the complete machining cycle is finished.

While my invention has been disclosed for purpose of illustration as comprising six cam or stop rings to provide a corresponding number of steps of machining operations, it will be apparent that a greater or lesser number of such stop rings can be employed depending upon the number of steps it is decided to execute. If it be decided to effect machining operations entirely by hand control, dial 67 is placed, for example, at its first position and left there throughout the operation. In such an instance the cam ring 34, corresponding to the set position for arm 49 as indicated by dial 67, will be set so that its cam 35 will correspond to an extreme position of the cross slide.

The dogs 72 and pins 74 and 75 are provided as a safety means to stop the cross slide at its extremes of movement if the operator should neglect to dissengage the feed controlling lever when the machine is being used for manual operations.

It will be apparent that by the use of my invention multiple steps of a machine operation may be rapidly and efficiently performed by a less skilled operator than has heretofore been possible with resulting economy of time and a considerable reduction in expense.

While I have shown a preferred embodiment of the invention I do not wish to be confined to the precise details illustrated, but desire to cover all modifications coming within the spirit and scope of my invention as set forth in the claims.

Having thus described my invention, I claim:

1. In a machine tool of the type described, a slide, a tool holder carried by said slide, driving means for moving said slide and tool holder, means for stopping the movement of said slide in each of a plurality of preselected positions thereof comprising, a plurality of individual camming means, a common support for said camming means, means to rotate said support and camming means in timed relationship with the movement of said slide, and means to disengage said driving means including a movable member and manually operable means independent of said tool holder for selectively positioning said member in the path of any one of said camming means to be moved thereby to effect the disengagement of the driving means.

2. In an apparatus of the type described, a cross slide, a tool holder carried by said cross slide, driving means for moving said slide and tool holder, means for stopping the movement of said slide in each of a plurality of preselected positions thereof comprising, a plurality of individually adjustable cams, means to rotate said cams in timed relationship with the movement of the cross slide, means to disengage said driving means including a rockable lever, and means for selectively positioning one arm of said lever in the path of any one of said cams to be rocked thereby for effecting disengagement of said driving means when said slide has reached the corresponding preselected position.

3. In a machine tool of the type described, a slide, a support for said slide, a drive carried by said support for moving said slide, a clutch comprising driving and driven members in said drive, means for stopping the movement of said slide in each of a plurality of positions including, a plurality of rotatable cams, a common support for said cams, an operative connection between said support and said driven clutch member to rotate said support and cams in timed relationship with the movement of the slide, a movable member, means manually operable for selectively positioning said movable member axially of said support in the path of any one of said cams to be engaged and actuated thereby when the latter is rotated by movement of said slide, and an operative connection between said movable member and said clutch to disengage the clutch when said movable member is actuated.

4. In an apparatus of the character described, a movable slide, a power drive to move said slide, a clutch interposed in said power drive, means including a lever for disengaging said clutch, a plurality of cam rings, means to rotate said cam rings in timed relationship to the movement of said slide, means to individually adjust said cam rings, a shaft for pivoting the said lever, means to move said lever along said shaft to selectively position one arm of the lever in the path of any one of said cams while retaining its other arm in engagement with the clutch disengaging means whereby the lever may be rocked by the cam in whose path it is positioned to disengage the clutch and stop the slide.

5. In a machine tool of the type described, a movable cross slide, an indexible tool holder mounted upon said cross slide and adapted to support a plurality of tools, power driving means to move said cross slide, a clutch interposed in said drive means, and means to disengage said clutch and stop the movement of the slide at one or more preselected positions thereof comprising, a drum, means to rotate the drum in timed relationship to the movement of the cross slide, a plurality of cam rings mounted on said drum for rotation therewith, a lever, a support for mounting said lever adjacent said drum for rocking movement transversely of the drum, said lever being movable along its support and having one arm of greater width than the other, means in engagement with the wider arm of the lever to operate the clutch disengaging means, and means to move the lever along its support to selectively position its narrower arm in the path of any one of said cams.

6. A machine tool as defined in claim 5 and further comprising means to individually adjust the angular positions of each of said cam rings.

7. In a machine tool of the type described, a slide, a support for said slide, a power drive carried by said support for moving said slide, a clutch interposed in said drive, a lever for engaging said clutch, means on said clutch lever and said support to retain said lever in clutch engaging position, and means to release said clutch lever retaining means at one or more preselected positions of said slide comprising, a plurality of rotatable camming means, a common support for said camming means, means to rotate said support and camming means in timed relationship with the movement of said slide, a cam-actuated member, means manually operable to selectively move said member axially relative to said support into the path of any one of said camming means for engagement thereby when the latter is rotated, and an operative connection between the cam-actuated member and the clutch lever retaining means to release the clutch lever when the slide has reached any of said preselected positions.

8. In an apparatus of the character described, a cross slide, power driving means to move the cross slide, a clutch interposed in said driving means, means for disengaging said clutch, a plurality of coaxially mounted cam rings, means to adjust the angular position of each of said rings, means to rotate said rings in timed relationship with the movement of said cross slide, an arm mounted for rocking movement adjacent said rings, means to move said arm into operative relationship with any one of said rings, a second arm engaging said clutch disengaging means, said arms being operatively connected to rock together whereby, when the first mentioned arm is engaged by the cam in whose path it is positioned, the clutch will be disengaged by said other arm and the slide stopped at a preselected position.

9. The apparatus of claim 8 further comprising, a plurality of dogs adjustably carried by said cross slide, a depressible rod in the path of said dogs, and an operative connection between said rod and the clutch disengaging means to stop said cross slide at predetermined limits of its movement.

10. In a machine tool having a tool support, driving means to move said support, a clutch in the driving means, and means to disengage the clutch, the improvement which comprises, a drum rotated in timed relationship with the movement of the tool support, said drum having a plurality of openings spaced about the circumference thereof, a plurality of cam rings mounted on said drum to rotate therewith and relative thereto, gear teeth upon the internal circumference of each of said rings, the gear teeth of each cam ring being in alignment with one of said openings in the drum, a plurality of spur gears journaled in the drum with the teeth of each one of said spur gears projecting through one of said openings and meshing with the teeth on the corresponding cam ring, means for individually turning each spur gear to adjust the position of the corresponding cam ring, a rockable and shiftable lever mounted adjacent said drum with one arm thereof in continuous engagement with the clutch disengaging means and the other arm selectively cooperable with any one of said rings, and means to shift said lever to position said last mentioned arm in the path of any one of said cam rings.

11. In a machine tool having a tool support, a power-operated driving means to move said support, a clutch interposed in the driving means, and means to disengage the clutch, the improvement which comprises, a drum, means to rotate the drum in timed relationship with the movement of the tool support, a plurality of cam rings mounted on said drum to rotate therewith and relative thereto, gear teeth upon the internal circumference of said rings, said drum having a plurality of openings in its circumference, there being an opening in alignment with the teeth on each ring with said openings being spaced circumferentially about the drum, a plurality of rods journaled in the drum, a spur gear on each rod projecting through one of said openings and meshing with the teeth on the corresponding ring, means on the end of each rod to rotate it and its corresponding ring, a shaft extending parallel with said drum, a lever journaled on said shaft for rocking thereabout and for sliding movement therealong, means to move said lever along the shaft to selectively dispose one arm thereof in the path of any one of said cams, the other arm of said lever being of sufficient size to remain in engagement at all times with the means to disengage the clutch whereby, when the first mentioned arm is moved by a cam, the lever will be rocked to disengage the clutch and stop the movement of the tool support.

12. In a machine tool of the type described, a cross slide, driving means for moving said slide, means for stopping the movement of said slide in each of a plurality of selected positions thereof comprising, a rotatable supporting member, a plurality of individually adjustable cams carried by said member for rotation therewith and circumferential adjustment relative thereto, means to rotate said member in timed relationship with the movement of the cross slide, means selectively actuated by any one of said cams to disengage said driving means when said slide has reached a corresponding preselected position, and means for individually circumferentially adjusting said cams relative to said member to an infinite number of different positions including a separate actuator for each cam, and means on each actuator cooperating with said member to retain the actuator and the cooperating cam in an adjusted position.

13. The combination as defined in claim 12 wherein said actuators are axially movable and rotatable relative to said member and the means for retaining the said actuators and cams in adjusted position comprise normally engaged cooperating friction surfaces on said actuators and members, the said surface on each actuator being selectively disengaged from the cooperating surface on said member by axial movement of the actuator in one direction thus permitting rotation thereof for effecting adjustment of the corresponding cam.

14. The combination as defined in claim 12 and wherein the said separate actuators are axially movable and rotatable relative to said member, a gearing connection between each of said actuators and the corresponding cam, means biasing each actuator into locking engagement with said member to thereby restrain the actuators from rotation and retain the corresponding cams in their adjusted positions, and means on each actuator by which the said actuators may be individually axially moved to release the locking engagement with said member and rotated while released to thereby adjust the corresponding cam.

NICHOLAS P. DARASH.

REFERENCES CITED

The following references are of record in the file of this patent:

UNITED STATES PATENTS

| Number | Name | Date |
|---|---|---|
| 670,837 | Bullard | Mar. 26, 1901 |
| 1,000,442 | Schellenbach | Aug. 15, 1911 |
| 1,072,484 | Miller | Sept. 9, 1913 |
| 1,168,683 | Seward | Jan. 18, 1916 |
| 1,248,941 | Sosa | Dec. 4, 1917 |
| 1,514,352 | Taylor et al. | Nov. 4, 1924 |
| 2,006,144 | Lovely | June 25, 1935 |
| 2,032,598 | Shaw | Mar. 3, 1936 |
| 2,348,908 | Jacobs | May 16, 1944 |
| 2,424,153 | Curtis et al. | July 15, 1947 |